United States Patent
Smith

(10) Patent No.: US 6,293,804 B2
(45) Date of Patent: *Sep. 25, 2001

(54) SELF-ALIGNING LCD CONNECTOR ASSEMBLY

(75) Inventor: Stacy Neil Smith, Apex, NC (US)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,683

(22) Filed: Feb. 8, 1999

(51) Int. Cl.[7] ............................. H01R 12/00; H05K 1/00
(52) U.S. Cl. ................................................. 439/66; 439/71
(58) Field of Search .......................... 439/66, 374, 71

(56) References Cited

U.S. PATENT DOCUMENTS

| | | | |
|---|---|---|---|
| 3,991,463 | * | 11/1976 | Squitieri et al. ................. 29/629 |
| 4,643,499 | * | 2/1987 | Mitchell ............................ 439/66 |
| 4,722,698 | * | 2/1988 | Modschiedler ................... 439/374 |
| 5,162,613 | * | 11/1992 | Schoenthaler .................... 174/88 |
| 5,358,412 | * | 10/1994 | Maurinus et al. ................ 439/66 |
| 5,473,510 | * | 12/1995 | Dozier, II ......................... 439/66 |
| 5,531,022 | * | 7/1996 | Beaman et al. .................. 439/66 |
| 5,709,576 | * | 1/1998 | Lippmann et al. ............... 445/3 |
| 5,905,638 | * | 5/1999 | MacDonald, Jr. et al. ...... 439/66 |
| 5,923,393 | * | 7/1999 | Chang et al. .................... 439/66 |
| 6,019,610 | * | 2/2000 | Glatts, III ........................ 439/66 |

\* cited by examiner

*Primary Examiner*—Brian Sircus
*Assistant Examiner*—Hae Moon Hyeon
(74) *Attorney, Agent, or Firm*—Myers Bigel Sibley & Sajovec

(57) ABSTRACT

An interconnection device for connecting a plurality of LCD contacts with a plurality of base circuit contacts. The interconnection device includes a non-conductive body having a U-shaped notch located for self-aligning engagement with a LCD driver chip. In addition, the non-conductive body includes at least one conductive lead. The conductive lead includes a first contact and a second contact that emerge from the non-conductive body. The contacts of the non-conductive body engage corresponding contacts of the LCD and base circuit board when the non-conductive body is engaged in alignment with the LCD driver chip.

21 Claims, 3 Drawing Sheets

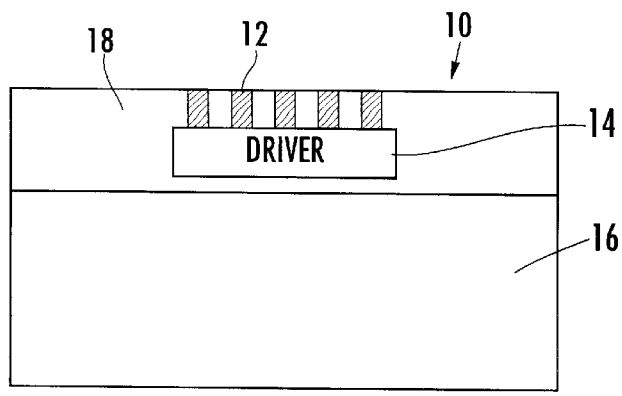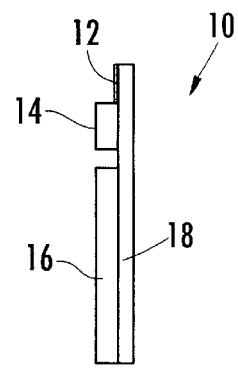
FIG. 1a.
(PRIOR ART)
FIG. 1b.
(PRIOR ART)
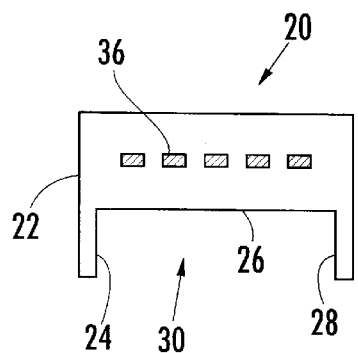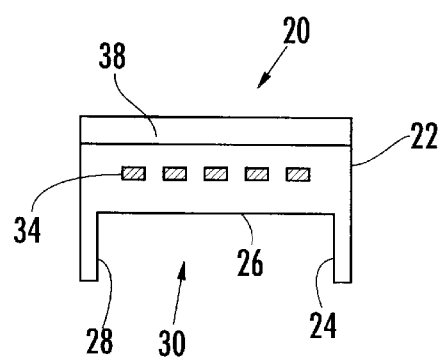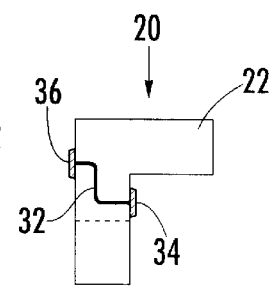
*FIG. 2a.*  *FIG. 2b.*  *FIG. 2c.*
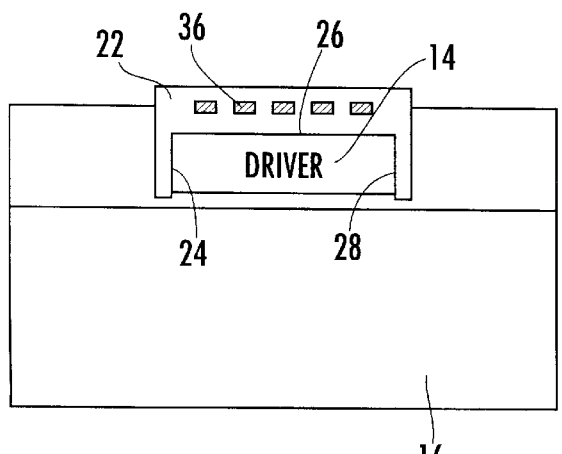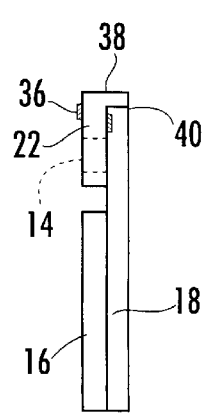
*FIG. 3a.*  *FIG. 3b.*

SELF-ALIGNING LCD CONNECTOR ASSEMBLY

FIELD OF THE INVENTION

The present invention relates generally to liquid-crystal display ("LCD") connectors, and in particular, to a mechanical self-aligning interconnect device used to connect an LCD with a base circuit.

BACKGROUND OF THE INVENTION

The number of cellular phones being used in the United States is growing at a rapid rate. This means that more and more people are carrying cellular phones with them from one location to another. As such, most cellular phone users desire a phone that is lightweight, compact, easy to carry and full of features. As a result of this demand, cellular phone designers are striving to develop smaller types of cellular phones that are still capable of incorporating all of the features that are available to cellular phone users.

Most cellular phones use an LCD to communicate information to the user while the phone is being used. A LCD uses strips or squares of liquid-crystal material to form digits or pixels that communicate information when energized. Some aspects of the manufacture of LCDs are extremely precise. For example, the tolerances for the location of the electrical traces or contacts on the LCD that are used to drive the LCD are on the order of ±0.025 mm. The electrical traces that interconnect the LCD with a second device are typically made from indium tin oxide ("ITO") or some other conductive material. However, other aspects of the LCDs are not as precise due to the nature of the materials that are used or the methods in which they are manufactured.

LCDs have a very wide tolerance for the mechanical dimensions of the glass and the positioning of the electrical traces with respect to the edges of the glass. These tolerance ranges are much larger and are generally only required to be accurate within ±0.200 mm or even greater. This large tolerance is predominantly a result of the manufacturing process that necessitates scoring and breaking of a larger glass panel to create discrete LCDs.

Due to the number of parts and their associated tolerances, designing mechanical interconnects for the LCDs that are used in cellular phones is problematic. This is particularly true for LCDs that use chip-on-glass technology, in which an LCD driver chip is bonded directly to the LCD glass. These designs do not incorporate a secondary connection means, such as a flex film, which is used in chip-on-flex and chip-on-tab technologies. Flex film is an array of conductors bonded to a thin dielectric film. In these designs, one end of the flex film is bonded to the LCD driver chip while the other end, because the flex film is flexible, may be manipulated and bent around objects until being connected to a circuit which drives the LCD driver chip. However, using flex film is no longer appealing in cellular phone designs due to size constraints.

In prior cellular phone designs, the LCD is generally held in place with a light guide. The LCD is mounted in the lightguide and the edges of the lightguide are used to align and hold the LCD in position. Thus, the edges of the LCD, which have wide tolerances, are used to align the LCD in place. In these devices, an LCD connector is retained by the lightguide and used to electrically connect the LCD with the printed circuit board of the cellular phone.

Since all known prior art cellular phone designs align the LCD by using the edge of the LCD glass they suffer from the large tolerances associated with the LCD glass. To that end, this creates connection and quality problems that are difficult to deal with in the manufacture of a larger number of cellular phones.

Since the LCD driver chip must be electrically connected with the contacts on the printed circuit board of the cellular phone an optimization of the respective interconnection between the of the LCD contacts and the printed circuit board contacts is required to provide a reliable and repeatable mechanical design. Best engineering practice dictates that the system must function under all tolerance conditions. However, since the LCD is captured and aligned by the edges of the LCD glass, ultimately the large glass tolerances drive the design of these devices to incorporate a large connection pad size and pitch, often beyond the limits of practicality. This hinders efforts to miniaturize the size of cellular phones.

Another problem that must be dealt with is that the performance and functionality of the LCD may be negatively impacted due to the relatively high resistance of the indium-tin oxide which is used as the material to electrically connect the driver to the pixels within the LCD. The ITO traces therefore need to be minimized for low resistance and optimal performance. This is in direct conflict with the requirements of large ITO pads required for reliable design. To illustrate, the acknowledge pulse of the typical LCD may not work if the connection resistance approaches 90 m$\Omega$, which allows for very little ITO in the electrical path.

As cellular phones get smaller and more featured, space within the transceiver has become extremely important. The problem associated with interconnecting the LCD with the cellular phone's printed circuit board was not dealt with in prior devices because designs were either accommodating to the large tolerances or design principles were sacrificed to meet space requirements. To that end, a need exists for a way to optimally electrically interconnect the LCD to the printed circuit board in a cellular phone with precision.

BRIEF SUMMARY OF THE INVENTION

The present invention discloses an interconnection device for interconnecting a plurality of contacts accurately positioned on an LCD with a plurality of connections on an underlying base circuit which provides operating signals to the LCD. The interconnection device solves the problems associated with the large tolerances of the LCD glass used in cellular phone applications by taking advantage of the characteristics of chip-on-glass LCD design. Chip-on-glass LCD design mounts an LCD driver chip to the LCD with a high degree of accuracy. By reducing the alignment tolerances by one order of magnitude, the LCD and printed circuit board interconnection can be improved significantly, reducing size, increasing performance and reliability, and easing the manufacture of the LCD and associated hardware. In addition, the interconnection device allows tighter framing of the LCD in the cellular phone or device.

The interconnection device directly takes advantage of the precision location of the LCD contacts and the LCD driver chip as a means to align the interconnection device to the LCD. As a necessity to the proper operation of the LCD, the LCD driver chip is normally mounted to a tolerance of ±0.04 mm in the LCD design. Further, the LCD driver chip is bonded to the glass permanently because the bonding agent used is stronger than the LCD glass. The LCD contacts are also precisely located on the LCD in relation to the LCD driver chip. As previously mentioned, the LCD contacts are normally made from ITO or some other conductive material.

By aligning the interconnection device with the LCD driver chip instead of the LCD glass, the tolerance of the glass is eliminated from the design. This allows the size of the LCD contacts, which are in electrical connection with the LCD driver chip, to be reduced by essentially twice the tolerance that is associated with using the LCD glass as the alignment point. These features will ensure that the contacts of the interconnection device make electrical contact with the LCD contacts at a much tighter tolerance than previously possible. The precise make-up of the contacts used on the interconnection device are irrelevant and could be selected from the group including spring contacts, pogo pins, a discreet conductive elastomer, or conductive wires.

The interconnection device preferably comprises a non-conductive body having at least one surface located for self-aligning engagement with the LCD driver chip. At least one conductive lead is included in the non-conductive body that has a first contact and a second contact that emerge from the non-conductive body. The first contact is used to make an electrical connection with the LCD contacts and the second contact is used to make an electrical connection with the base circuit contacts.

BRIEF DESCRIPTION OF THE DRAWINGS

FIG. 1a depicts the top view of an LCD.

FIG. 1b is a right side view of the LCD assembly depicted in FIG. 1a.

FIG. 2a is a top view of an interconnection device.

FIG. 2b is a bottom view of the interconnection device depicted in FIG. 2a.

FIG. 2c is a right end view of the device depicted in FIG. 2b.

FIG. 3a depicts a top view of an interconnection device connected with the LCD driver chip.

FIG. 3b is a right side view of FIG. 3a.

DETAILED DESCRIPTION OF THE PRESENTLY PREFERRED EMBODIMENTS

Figure 4A:
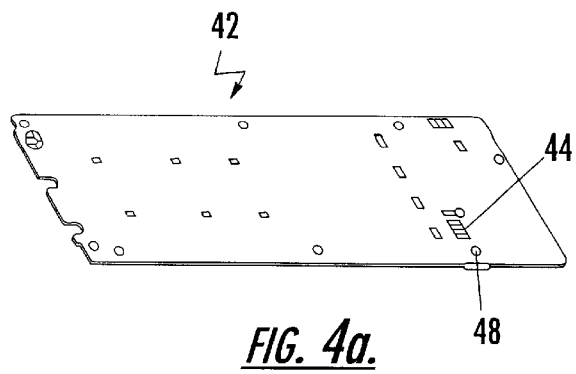
FIG. 4a is a perspective view of a base circuit.

Referring to FIGS. 1a and 1b, a typical LCD 10 is disclosed that has a plurality of LCD contacts 12 that are electrically connected with a driver chip 14 on the LCD 10. Generally, when the LCD 10 is designed by the manufacturer, the driver chip 14, together with an upper glass plate 16, are mounted on a lower glass plate 18. As previously set forth, the LCD contacts 12 are positioned in relation to the driver chip 14 with a high degree of accuracy. This is because the design tolerances for the driver chip 14 require the LCD contacts 12 to be positioned with a high degree of precision. The upper glass plate 16 and the lower glass plate 18 are typically bonded together with a bonding agent. Such LCDs are known in the art, and are employed in various devices, such as cellular phones. The exact shape and size of the LCD 10 may vary depending on the particular design of the cellular phone.

FIGS. 2a, 2b and 2c illustrate a preferred embodiment of an interconnection device 20. The interconnection device 20 electrically connects the LCD contacts 12 (see FIG. 1a) with a base circuit board 42 (see FIG. 4a) that includes a plurality of base circuit contacts 44. The base circuit board 42 should be broadly construed to include any electrical circuitry that can provide operating signals to the LCD 10 during operation, such as the base circuit in a typical cellular phone.

The interconnection device 20 has a non-conductive body 22 that is made from any suitable dielectric material, such as plastic for instance. As depicted in FIGS. 2a and 2b, the interconnection device 20 includes a plurality of engagement surfaces 24, 26, 28, that are used connect the non-conductive body 22 to the driver chip 14 of the LCD 10. In the preferred embodiment, the plurality of engagement surfaces 24, 26, 28 form a U-shaped notch 30 that fits securely around the perimetrical edges of the driver chip 14, as shown in FIG. 3a. As illustrated in FIG. 2a, 2b and 3a, the engagement surfaces 24, 28 engage the edges of the driver chip 14.

Referring to FIG. 2c, the interconnection device 20 includes at least one conductive lead 32 that is located in the non-conductive body 22. The exact positioning of the at least one conductive lead 32 will vary, depending on the design tolerances of the interconnection device 20. Each conductive lead 32 has one or more first contacts 34 and one or more second contacts 36. As depicted, the one or more first contacts 34 emerge from the non-conductive body 22 on the bottom surface of the non-conductive body 22 and the one or more second contacts 36 emerge from the non-conductive body 22 on its top surface. The first contacts 34 and the second contacts 36 may be, for example solder pads, spring contacts, pogo pins or discreet conductive elastomers.

As depicted in FIGS. 3a and 3b, the interconnection device 20 securely clips to the driver chip 14 of the LCD 10 in a friction fit, wherein the engagement surfaces 24,28 press against the ends of the driver chip 14. As previously stated, the interconnection device 20 uses the precise positioning of the driver chip 14 in relation to the LCD contacts 12 to advantageously mate each respective first contact 34 with a respective LCD contact 12. Once the interconnection device 20 is clipped to the driver chip 14 the LCD contacts 12 are electrically connected with the first contacts 34.

In the embodiments depicted in FIGS. 2a, 2b and 2c, the non-conductive body 22 is formed having an L-shaped cross section. As illustrated in FIG. 3b, the base 38 of the non-conductive body 22 mates with a top edge 40 of the LCD 10. It should be noted however, that the non-conductive body 22 may not include the base 38. The engagement surfaces 24,28 provide the critical alignment feature in relation to the driver chip 14. Referring to FIG. 3a, the x-axis of the LCD 10 is the most critical feature for purposes of proper alignment. Due to the nature of the positioning of the LCD contacts 12 the y-axis of the LCD 10 is not as critical as the x-axis of the LCD 10.

Referring to FIG. 4a, a base circuit board 42 is illustrated that includes one or more base circuit contacts 44. As previously set forth, the base circuit board 42 should be broadly construed to include any device that contains electrical circuitry that can provide operating signals to the LCD 10. The base circuit board 42 illustrated in FIG. 4a is for illustrative purposes only and should not be construed as a limitation of the present invention. Those skilled in the art would recognize that the base circuit board 42 may have many different shapes and sizes other than that depicted in FIG. 4a.

Figure 4B:
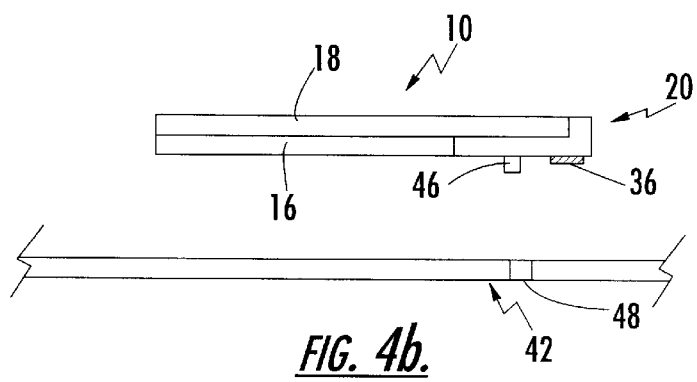
FIG. 4b is a side view of an interconnection device, connected with an LCD before being mated with a base circuit.

Referring to FIG. 4b, the interconnection device 20 is shown clipped to the LCD 10 before being connected with the base circuit board 42. In some preferred embodiments, the interconnection device 20 may include one or more pins 46, which engage apertures 48 in the base circuit board 42 to align the interconnection device 20 in relation to the base circuit board 42. The pin 46 is designed to fit in its corresponding aperture 48 located in the base circuit board 42. The exact position of the pin or pins 46 is not critical, however, the pin or pins 46 should be positioned clear of the second contacts 36. Also, each pin or pins 46 may be dimensioned to provide a friction fit with its associated aperture 48.

Figure 5:
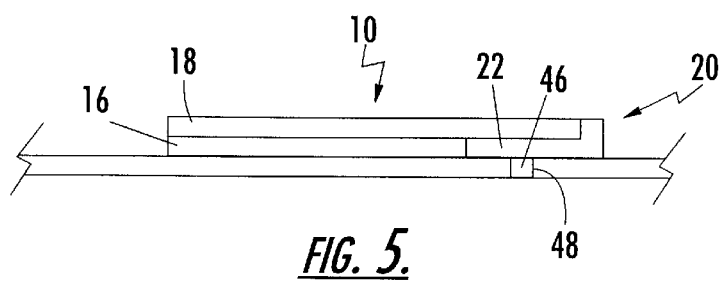
FIG. 5 is a side view of the LCD, the interconnection device, and a base circuit after being mated together.

FIG. 5 illustrates the interconnection device 20 assembled with the LCD 10 and the base circuit 42. As depicted, the interconnection device 20 precisely positions the LCD contacts 12 in electrical contact with the base circuit contacts 44, thereby interconnecting the two components. The interconnection device 20 allows the LCD 10 to be connected with the base circuit 42 in an extremely precise, compact, and removable manner. If desired, the one or more second contacts 36 may be soldered to the base circuit contacts 44 to provide a permanent electrical connection.

Figure 6:
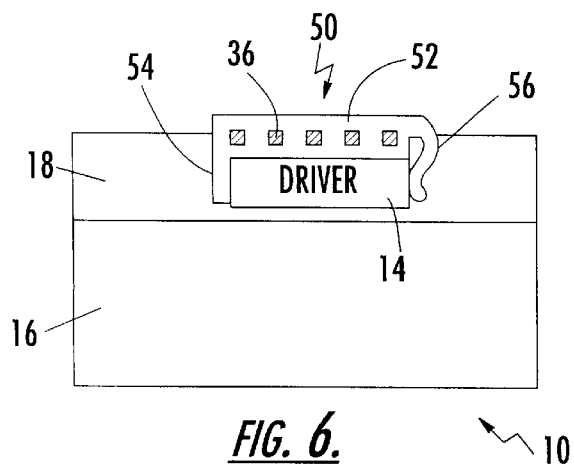
FIG. 6 illustrates a bottom view of an interconnection device having a spring arm.

Referring to FIG. 6, another embodiment discloses an interconnection device 50 with a non-conductive body 52 including a projecting surface 54 spaced for self-aligning engagement with one side surface of the driver chip 14. In this embodiment, a portion of the non-conductive body 52 opposite the projecting surface 54 is a spring arm 56. The spring arm 56 is sufficiently flexible to accommodate variations in driver chip 14 tolerances, while still assuring that the interconnection device 50 is aligned and secured to the driver chip 14.

Figure 7:
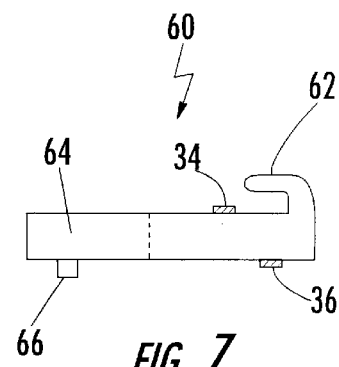
FIG. 7 illustrates a side view of an interconnection device having a hook.

Referring to FIG. 7, another embodiment discloses an interconnection device 60 that includes a clip 62 that resiliently connects the non-conductive body 64 of the interconnection device 60 to the edge of the LCD 10. In this embodiment, the clip 62 resiliently secures the interconnection device 60 to the top edge of the LCD 10, thereby securely holding the interconnection device 60 in place. As with the other embodiments, this disclosed embodiment may also include a pin 66 to align the interconnection device 60 with a base circuit board 42.

Figure 8:
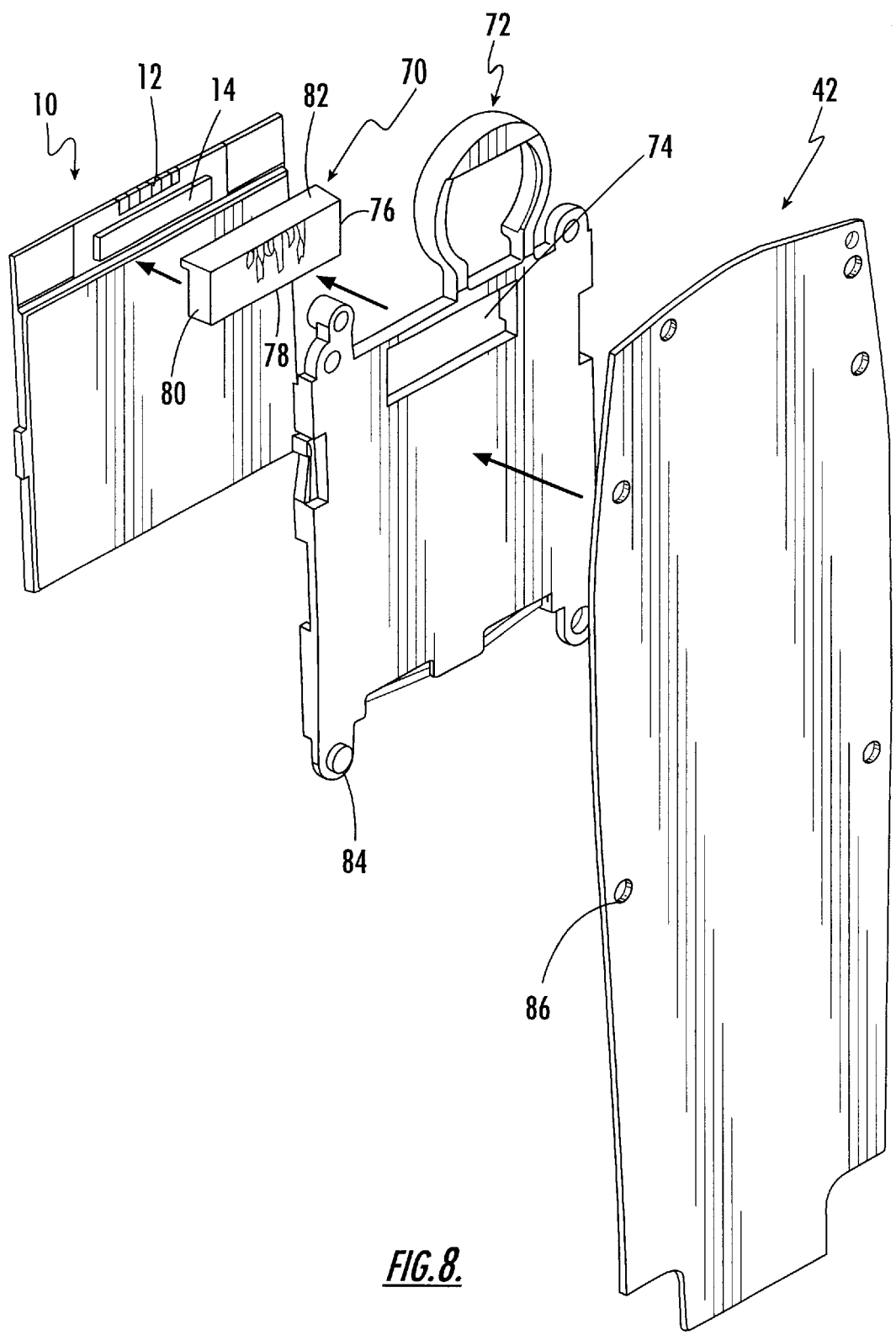
FIG. 8 illustrates an exploded perspective view of an LCD, an interconnection device, a light guide, and a base circuit before assembly.

FIG. 8 shows an alternative method of using an interconnection device 70. In this method, a light guide 72 further assists alignment of the interconnection device 70 in the final assembly of the cellular phone. The light guide 72 includes a generally square shaped aperture 74 that fits around the perimetrical edges 76, 78, 80, 82 of the interconnection device 70, which is itself engaged and aligned with the driver chip 14. The light guide 72 is therefore aligned with the driver chip 14. Pins 84 of the light guide engage corresponding apertures 86 of the base circuit board 42 and therefore align the base circuit board 42 with the light guide 72. Thus, the light guide 72 acts as an intermediate component that is carried on the interconnection device 70 and defines the structures 84 that align the circuit board 42 with the contacts 36. The pins 84 can be dimensioned to provide a friction fit in the apertures 86, thereby securing the light guide 72 to the base circuit board 42. The interconnection device 70 interconnects the LCD contacts 12 with the base circuit contacts 44 (not shown in FIG. 8) as with other embodiments.

While the invention has been described in its currently best known modes of operation and embodiments, other modes and embodiments of the invention will be apparent to those skilled in the art.

What is claimed is:

1. A method of aligning an electrical connector with a chip-on-glass liquid crystal display and a circuit board, the circuit board having a first electrical contact thereon, the liquid crystal display including a glass substrate, a second electrical contract on the glass substrate, and a driver chip mounted on the glass substrate at a fixed location relative to the second electrical contract, the method comprising the steps of:

directly engaging an exterior surface of the driver chip with the electrical connector to align the second electrical contact with a third electrical contact carried on the electrical connector; and engaging the circuit board with the electrical connector to align the first electrical contact with a fourth electrical contact carried on the electrical connector.

2. The method of claim 1 wherein the step of engaging the circuit board comprises the step of directly engaging the circuit board with the electrical connector to align the fourth electrical contact with the first electrical contact.

3. The method of claim 2 wherein the step of directly engaging the circuit board comprises the step of engaging a pin extending from the electrical connector in a mating aperture in the circuit board to align the fourth electrical contact with the first electrical contact.

4. The method of claim 1 wherein the step of engaging the circuit board comprises the step of directly engaging the electrical connector with an intermediate component and directly engaging the circuit board with the intermediate component to align the fourth electrical contact with the first electrical contact.

5. The method of claim 1 wherein the step of engaging the circuit board comprises the step of directly engaging an outer periphery of the electrical connector with an opening in a light guide and directly engaging the circuit board with the light guide to align the fourth electrical contact with the first electrical contact.

6. The method of claim 1 further comprising the step of using a clip extending from the electrical connector to secure the electrical connector to an edge of the glass substrate.

7. The method of claim 1 further comprising the step of using opposed surfaces extending from the electrical connector to secure the electrical connector to the driver chip.

8. An electrical connector for use in an electronic assembly including a first substrate with a surface defining a first plane and having a first electrical contact thereon, and a second substrate with a surface defining a second plane and having at least part of an electronic circuit thereon, the at least part of an electronic circuit including a second electrical contact and an electronic component mounted on the second substrate at a fixed location relative to the second electrical contact, the electrical connector comprising:

third and fourth electrical contacts electrically connected by a conductor;

a non-conductive body carrying the third and fourth electrical contacts and the conductor, the third and fourth contacts having fixed locations on the body relative to each other;

a first surface on the body to engage a surface on the electronic component to align the third electrical contact with the second electrical contact in a direction that is nominally parallel to the second plane; and a second surface located on the body to engage a surface on the first substrate to align the fourth electrical contact with the first electrical contact in a direction that is nominally parallel to the first plane.

9. The electrical connector of claim 8 further comprising:

a third surface on the body to engage another surface on the electronic component to retain the third electrical contact in alignment with the second electrical contact in the direction that is nominally parallel to the second plane; and a fourth surface on the body to engage another surface on the first substrate to retain the fourth electrical contact in alignment with the first electrical contact in the direction that is nominally parallel to the first plane.

10. The electrical connector of claim 9 wherein the body comprises a spring arm defining the third surface.

11. The electrical connector of claim 9 wherein the body comprises a U-shaped notch defining the first and third surfaces.

12. The electrical connector of claim 9 further comprising an intermediate component on the body defining the second and fourth surfaces.

13. The electrical connector of claim 8 wherein the body comprises a pin defining the second surface.

14. The electrical connector of claim 8 wherein the body comprises a clip extending therefrom to engage an edge of the second substrate to secure the electrical connector thereto.

15. An electrical connector for use in an electronic assembly including a first substrate with a surface defining a first plane and having a first electrical contact thereon, and a liquid crystal display including a glass substrate with a surface defining a second plane, a second electrical contact on the glass substrate, and a driver chip mounted on the glass substrate at a fixed location relative to the second electrical contact, the electrical connector comprising:

third and fourth electrical contacts electrically connected by a conductor;

a non-conductive body carrying the third and fourth electrical contacts and the conductor, the third and fourth contacts having fixed locations on the body relative to each other;

a first surface on the body to engage a surface on the driver chip to align the third electrical contact with the second electrical contact in a direction that is nominally parallel to the second plane; and a second surface located on the body to engage a surface on the first substrate to align the fourth electrical contact with the first electrical contact in a direction that is nominally parallel to the first plane.

16. The electrical connector of claim 15 further comprising:

a third surface on the body to engage another surface on the driver chip to retain the third electrical contact in alignment with the second electrical contact in the direction that is nominally parallel to the second plane; and a fourth surface on the body to engage another surface on the first substrate to retain the fourth electrical contact in alignment with the first electrical contact in the direction that is nominally parallel to the first plane.

17. The electrical connector of claim 16 wherein the body comprises a spring arm defining the third surface.

18. The electrical connector of claim 15 wherein the body comprises a U-shaped notch that conforms to an exterior surface of the driver chip, and the first surface is defined by the U-shaped notch.

19. The electrical connector of claim 15 further comprising a light guide on the body defining the second surface.

20. The electrical connector of claim 15 wherein the body comprises a pin defining the second surface.

21. The electrical connector of claim 8 wherein the body comprises a clip extending from the body to engage an edge of the glass substrate to secure the electrical connector thereto.

* * * * *